United States Patent [19]

Morrison et al.

[11] 4,206,191
[45] Jun. 3, 1980

[54] PREPARATION OF LITHIUM AMIDE

[75] Inventors: Robert C. Morrison; Ricardo O. Bach, both of Gastonia, N.C.

[73] Assignee: Lithium Corporation of America, Gastonia, N.C.

[21] Appl. No.: 970,531

[22] Filed: Dec. 18, 1978

Related U.S. Application Data

[63] Continuation-in-part of Ser. No. 877,122, Feb. 13, 1978, abandoned.

[51] Int. Cl.$^2$ ............................................. C01D 15/00
[52] U.S. Cl. .................................................... 423/413
[58] Field of Search ......................................... 423/413

[56] References Cited

U.S. PATENT DOCUMENTS

| | | | |
|---|---|---|---|
| 2,202,994 | 6/1940 | Nieuwland | 423/413 |
| 2,612,436 | 9/1952 | Overhoff et al. | 423/413 |
| 3,542,512 | 11/1970 | Honeycutt | 423/413 |

FOREIGN PATENT DOCUMENTS 601047  7/1934  Fed. Rep. of Germany.

OTHER PUBLICATIONS

Greenlee et al, *Inorganic Synthesis*, vol. II, McGraw Hill Book Co., N.Y., 1946, pp. 128-135.

*Primary Examiner*—G. O. Peters
*Attorney, Agent, or Firm*—Wallenstein, Spangenberg, Hattis & Strampel

[57] ABSTRACT

A low temperature method of preparing finely divided lithium amide. A mixture is first formed of bulk pieces of lithium metal with a catalyst such as active metallic cobalt in an inert liquid aromatic hydrocarbon, such as toluene, at about 0° C. to about −60° C. Anhydrous liquid ammonia is then added, aided by stirring, the lithium metal dissolving, two immiscible phases forming, one a so-called lithium-ammonia bronze solution being the top phase, and the toluene being the bottom phase. The formation of the lithium amide is then effected by raising the temperature under conditions of stirring, hydrogen and excess ammonia being liberated and the lithium amide, generally light grey in color, is formed which separates out in a very finely divided solid state, as a slurry in the toluene, and is recovered.

9 Claims, No Drawings

PREPARATION OF LITHIUM AMIDE

This application is a continuation-in-part of application Ser. No. 877,122, filed Feb. 13, 1978, now abandoned.

Our invention is concerned with a novel method of producing lithium amide, which method is characterized, overall, by significant improvements over heretofore known methods with which we are familiar which either have been used commercially or which have been suggested by workers in the art. In the practice of our method, the reactions are carried out at relatively low temperatures, for instance, at temperatures of the order of ordinary room temperatures or somewhat below or somewhat above room temperatures, generally not exceeding about 70° C., the lithium metal employed in the practice of the method of our invention is used in bulk or relatively large pieces or aggregates, and in the presence of certain catalysts, particularly active metallic cobalt. It is particularly critical to the practice of our method that the reaction be carried out in the presence of a liquid aromatic hydrocarbon solvent, particularly toluene, in which the lithium amide is formed because, among its other functions, the toluene or similar liquid aromatic hydrocarbon serves as a rate of reaction promoting agent or co-catalyst in conjunction with the catalyst proper such as, for instance metallic cobalt. In short, the toluene or similar liquid aromatic hydrocarbon does not serve as an inert liquid reaction medium. Thus, for instance, by way of illustration, if the reaction for the production of lithium amide, as otherwise described herein, is carried out in n-hexane as a liquid reaction medium, the rate of reaction is very much less, for instance, in various cases, of the order of about one-tenth, than where toluene is utilized. Furthermore, the reaction goes to completion or essential completion where the toluene is used whereas this is not the case when n-hexene is employed. Still further, where toluene or similar liquid aromatic hydrocarbons are used, the lithium amide which is formed in the practice of the method of the present invention is in the form of extremely fine particles, in certain cases as small microscopic particles, thereby avoiding the need, and the costs involved, in grinding operations or the like and the avoidance of introducing impurities in the lithium amide due to exposure to atmospheric moisture and other possible contaminating influences. The method of our invention is carried out simply and, under optimum conditions, with the production of high yields of lithium amide, for instance, of the order of about 90%. Another advantage of the use of toluene or similar liquid aromatic hydrocarbons is that the lithium-ammonia is maintained as the top layer separated from the toluene or similar liquid aromatic hydrocarbon into which the lithium amide sinks. This not only aids in stirring but, also, increases the reaction rate because the lithium and lithium amide are not intermingled and stay separated.

Although the mechanism of the functioning of toluene or equivalent liquid aromatic hydrocarbon as a co-catalyst has not been elucidated, it is postulated, for instance in the case of toluene, that it reacts with the lithium in liquid ammonia to form benzyllithium, with the evolution of hydrogen, and that the benzyllithium reacts immediately with ammonia to form lithium amide and to effect regeneration of toluene. Whether this postulation is correct or not is, of course, not material since the fact is, as has been stated and demonstrated, that the toluene or equivalent liquid aromatic hydrocarbon is involved actively in the particular reactions of the present method and does not function simply as an inert reaction medium.

It may also be observed, and as will be adverted to further below, that, in contrast to certain known procedures, nitrogen compounds, such as amino pyridine, or oxides such as peroxides of sodium and potassium, which have been required to be utilized as catalysts in order to obtain suitable reaction rates, the method of our invention does not require and most advantageously avoids the use of such nitrogen compounds which tend to cause the formation or relatively impure lithium amide and cause other problems, and the same is true with respect to the matter of the use of peroxides such as sodium peroxide which, apart from other considerations, is strongly suspected as being responsible for the instability and potential explosive character of sodium amide made therewith. The practice of our method results in the initial production of lithium amide of a high purity and of excellent stability under proper storage conditions.

DESCRIPTION OF PRIOR ART REFERENCES

Heretofore known and suggested methods for producing sodium amide, lithium amide and alkali metal amides are shown and referred to in such U.S. Pat. Nos. 2,202,994; 2,612,436 and 3,542,512; in German Pat. Nos. 601,047 and 742,255; and in such publications as Inorganic Syntheses, Vol. II, 1946, pp. 128-135, McGraw-Hill Book Company, Inc., New York, N.Y.

Certain prior suggested procedures for the preparation of lithium amide have involved reacting neat lithium metal and ammonia at high temperatures, of the order, for instance, of about 400° C. or above. Such procedures were unsatisfactory because, among other disadvantages, of the difficulty of controlling the highly exothermic reaction. Moreover, side reactions resulted in the formation of $Li_2NH$ and, possibly, also, $LiH$. Furthermore, the lithium amide produced by such procedures is in melted form and, upon solidification, required grinding to make it suitable for most uses.

As more particularly shown in the aforesaid U.S. Pat. No. 2,202,994, the production of alkali metal amides, particularly sodamide, under various then prior known procedures is described, together with the three patentee's improved process which latter involves reacting pieces of alkali metals with liquid ammonia, preferably in excess, at the boiling point of ammonia at normal pressures, −33° C., or, under pressure, at temperatures up to 132° C., or at low temperatures by cooling, in the presence of both an oxide of an alkali metal together with a small amount of a catalyst, such as an ammonia—soluble hydrated salt or iron, cobalt or nickel, for instance, powdered ferric nitrate. Hydrogen is evolved in the reaction. The alkali metal amide is recovered by evaporation of the liquid ammonia, the alkali metal amide being obtained as a finely divided powder. The said patent also points out that the thus prepared solutions of the alkali metal amides in liquid ammonia can then be used to obtain suspensions of the alkali metal amides in finely divided and reactive form in solvents other than ammonia as, for instance, by mixing toluene with the aforesaid previously produced ammonia solutions of sodamide and warming to remove ammonia, whereby sodamide suspensions in toluene are formed. Toluene is not used in the process of producing the sodamide but only after the sodamide has already been produced. Moreover, the process of this patent is carried out in the presence of an alkali metal oxide, particularly sodium peroxide.

The aforementioned U.S. Pat. No. 2,612,436, which appears to correspond to German Pat. No. 742,255, describes several previously known procedures for producing alkali metal amides, all of which are stated to be characterized by certain disadvantages, one of such procedures comprising dissolving the alkali metal in a liquid ammonia solution in an inert solvent medium, in the presence of various inorganic materials or catalysts, prior to evaporating the excess ammonia, but said process is stated to have the objection of requiring the use of relatively expensive liquid ammonia and the requirement for reaction temperatures below about $-33°$ C. or exceedingly high reaction pressures. The procedure which constitutes the invention of said patent, wherein sodium amide is shown to be prepared, involves forming a dispersion of liquid sodium metal in a basic amino compound such a dimethylaniline, in an inert liquid reaction medium which may be paraffin oil or a N,N-dialkyl arylamine or dimethylaniline, decalin, naphthalene, vaseline oil, toluene, alkyl-toluenes or alkylnaphthalines, and in the presence of an inorganic catalyst mixture or promoter, which may contain or comprise sodium peroxide, passing ammonia continuously through the reaction mixture whereby gaseous hydrogen is evolved, the reaction being carried out at about 140°–170° C., cooling and filtering under a nitrogen atmosphere, and recovering the sodamide which is produced and worked up with, for example, gasoline to produce finely divided white crystals of sodium amide. Such procedure, as is apparent, is radically different from the method of our present invention, and even though toluene and alkyl-toluenes are shown, among many others, as being liquid reaction media for use in the particular process of said patent, they function as inert liquid media, as is expressly stated in said patent, and they do not function in the process of said patent as they do in the particular and distinctly different method of our present invention as reaction rate increasing and co-catalyst materials.

In the aforementioned U.S. Pat. No. 3,542,512, after referring to certain previously known methods for preparing lithium amide, the method of said patent is described pursuant to which a liquid lithium metal solution in liquid ammonia is admixed with an inert liquid medium, preferably mineral oil, heated to about 200° C. The lithium amide which is formed is in a finely divided state suspended in the mineral oil and the gaseous ammonia and hydrogen which are generated quickly pass out of the reaction mixture. The finely divided lithium amide is recovered from the mineral oil by filtration under an inert gas pressure, washed with dry hexane and obtained as a white, free-flowing powder.

The process of the aforesaid German Pat. No. 601,047 is similar to that of U.S. Pat. No. 2,202,994 in the sense that toluene is shown to be used as a medium for suspending previously prepared alkali metal amides, not as a material which is present in the process of producing lithium amide and partaking in the reaction to increase the rate of reaction and acting as a co-catalyst in the process of producing or forming lithium amide.

The aforementioned Inorganic Syntheses publication discloses the preparation of sodium amide primarily by a procedure which involves introducing liquid ammonia, under anhydrous conditions, into a cooled or refrigerated flask provided with a stirrer. A catalyst, such as ferric nitrate, is added to the flask under conditions of stirring. If the catalytic mixture contains sodium peroxide, which acts as a promoter, the rate of formation of the sodium amide is stated to be double or tripled. A brisk stream of dry air is fed deep into the reaction mixture for a limited period of time. Pellets of sodium metal are added to the contents of the flask, while stirring, which results in the evolution of gaseous hydrogen. The sodium amide which forms is almost insoluble in liquid ammonia and appears in the form of a grainy sludge. The ammonia is allowed to evaporate, a vacuum is drawn on the residue, the vacuum is broken with dry gaseous nitrogen and the resulting cake of sodium amide is broken up with a stick. When freshly prepared by the above described method, the sodium amide is stated to be easily pulverized into a mass of crystals like fine sand and is characterized by a light color. Lithium amide is stated to be prepared by the same method as described in the Inorganic Syntheses article, reference being made in said connection to Campbell and Campbell, Proc. Indiana Acad. Sci., 50, 123 (1940).

While, as indicated above in the Campbell and Campbell article, the statement is made that lithium amide can be prepared by the same method as described in the aforesaid Inorganic Syntheses article, it has now been found that the process of our invention cannot be used for the preparation of sodium amide, certainly in any way that could be regarded as having any usefulness. There is no doubt that certain methods for the preparation of sodium amide can be used with at least reasonably similar results in the preparation of lithium amide or other alkali metal amides, but it is important to note that it does not necessarily follow that this is the case, and the present situation is an excellent example of the fallacy of any such assumption or generality.

Such previously known methods, in certain cases, to be sure, possess certain advantageous aspects, but they are also characterized by objectionable features, in relation to each other as well as in relation to other heretofore known or suggested procedures. Hence, so far as we are aware, even in those instances where, from a procedural standpoint or ease of operation, there are certain desirable features in such known methods, as previously noted above, the overall aspects thereof, and of other known methods, are such that, taken in their totality, no method has heretofore been suggested which possesses the attributes of relative freedom from procedural difficulties coupled with significant economies in cost of production such as are achieved by our present invention. Considered from such overall standpoint, therefore, our invention represents a commercially particularly advantageous method of producing lithium amide.

SUMMARY DESCRIPTION OF THE INVENTION

Lithium metal, in bulk form, or in relatively large pieces or aggregates, together with a catalyst, especially advantageously finely divided metallic cobalt, dispersed in a liquid aromatic hydrocarbon substrate or solvent, most advantageously, toluene, in a suitable vessel protected from access to air, and especially desirably in an inert gas atmosphere, such as argon or helium, is cooled preferably to well below room temperature, for instance to about 0° C., better still from about $-20°$ to $-30°$ to about $-40°$ to about $-60°$ C. or even lower, and then liquid ammonia is gradually added at a controlled rate under conditions of agitation and while maintaining a low reaction temperature to dissolve the lithium metal. The reaction is carried out until at least most of the lithium metal dissolves to form a so-called bronze solution. Complete solution of the lithium metal in the liquid ammonia requires at least 4 moles of the liquid ammonia per atom of the lithium metal to obtain such solution, measured at the boiling point of liquid ammonia. The resulting solutions are rather dilute and are generally bluish in color.

As has been stated above, it is critical to the practice of the present invention that the reaction medium, in which the bulk form or relatively large pieces or aggregates of the alkali metal, the catalyst and liquid ammonia are initially reacted at low temperatures, consist of or contain appreciable proportions of toluene or other equivalent liquid aromatic hydrocarbon. In short, the toluene or equivalent liquid aromatic hydrocarbon is present in the reaction mixture during the formation, at low temperatures such as, for instance, $-30°$ to $-60°$ C., of the intermediate lithium-ammonia compound in solution in the liquid ammonia, that is, prior to the formation of the lithium amide. This is to be clearly distinguished from the procedure shown, as referred to above, in U.S. Pat. No. 2,202,994, where toluene is added to the already previously formed sodamide solution in ammonia and then warming is effected to remove ammonia whereby, from the already previously produced sodamine solution, the sodamine precipitates and forms a suspension in said later added toluene.

Continuing further with the description of the method of our present invention, the foregoing dilute solutions, which are generally bluish in color, are then, most advantageously, admixed with a substantially additional amount of toluene or functionally equivalent liquid aromatic hydrocarbon. The temperature is then raised or is allowed to arise, for instance, by gradually heating the reaction vessel, under conditions of agitation, whereby gaseous hydrogen and excess gaseous ammonia are liberated, whereupon the solid lithium amide forms in a finely divided solid state and, having considerably greater density than the bronze lithium-ammonia solution, falls and precipitates in the lower toluene or equivalent liquid aromatic hydrocarbon, freeing new surfaces of the bronze solution for formation and separation of finely divided solid lithium amide, and this continues until all or essentially all of the lithium values are converted to solid, finely divided lithium amide. As noted above, the said lithium amide forms a dispersion in or slurry with the toluene or equivalent aromatic hydrocarbon liquid. Such ammonia as may be present in the slurry is removed and desirably recovered, for use, for instance, by liquifying the ammonia and recycling or reusing it in the system, and the finely divided solid lithium amide is recovered or separated from the toluene or equivalent liquid aromatic hydrocarbon in any suitable or convenient manner as, for instance, by filtration.

The active metallic cobalt catalyst, where that catalyst is used in the practice of the method of the present invention, may be prepared as a premix with a small amount of lithium metal. To that end, a cobalt halide, particularly cobalt chloride hexahydrate, and a small amount of lithium metal, which is preferably in finely divided form, are dispersed in a mineral oil and said dispersion is heated to melt the lithium metal which effects a reduction of the cobalt chloride to active metallic cobalt. The mineral oil and the resulting dispersion therein containing the active metallic cobalt and such lithium metal as is present are separated and the remaining dispersion is washed with toluene or other equivalent inert aromatic liquid hydrocarbon, to provide a slurry, and the resulting slurry can conveniently be incorporated as such into the subsequent reaction mixture without the necessity of separating the active metallic cobalt, as such, for incorporation into the reaction mixture for producing the lithium amide.

An alternate method of preparing the cobalt catalyst is to interact the cobalt compound with an alkyllithium, for instance, butyllithium, solution in situ prior to the addition of the reactants and solvents. This avoids the use of dispersed lithium metal so that all of the lithium metal used in the method of the invention can be in bulk form. This alternate method is, generally speaking, preferred since it is more conveniently carried out.

In place of active metallic cobalt as the catalyst, other active metal catalysts or metal salts capable of catalyzing the reaction can be used as, for instance, active nickel, manganese, copper, platinum black, and various transition metals, as well as metal compounds or salts as, for instance, ferric sulfate, and salts of nickel and of cobalt such as anhydrous cobalt chloride. It is believed that, where metal salts are used, they are reduced under the reaction conditions to the free metal and that it is the free metal which acts as the catalyst. Active metallic cobalt in finely divided form including microscopic particles, is, however, very substantially superior as a catalyst and its use, therefore, added as such or formed in situ, represents an especially advantageous embodiment of this aspect of our present invention. Such catalysts as finely divided active metallic cobalt, for example, excercise their catalytic activity in both the initial step of converting the lithium metal to the intermediate $Li(NH_3)_4$ and in the subsequent step of converting said latter compound to lithium amide in accordance with the method of the present invention. While the active metallic cobalt can be obtained simply by contacting a reducible cobalt compound, particularly a cobalt halide such as cobalt chloride hexahydrate, with molten lithium metal, or by heating a mixture of such cobalt compound with solid lithium metal and heating such mixture to a temperature sufficient to melt the lithium metal, or somewhat above such temperature, it is preferred to produce the active metallic cobalt in the manner described above and as is more specifically described below in Example 3 which represents the best embodiment of our invention of which we are presently aware.

While toluene has been found to be especially satisfactory as the liquid substrate medium utilized in the practice of the present invention, other liquid aromatic hydrocarbons can be used having melting points which are lower than the boiling point of liquid ammonia at atmospheric pressure and in which the lithium amide is soluble in the liquid ammonia at the temperatures at which it is formed in the reactions of the method of the present invention. Illustrative of such liquid hydrocarbons are ethylbenzene, diethylbenzene, propylbenzene, isopropylbenzene, diisopropylbenzene, and the xylenes or mixtures thereof. The toluene, or other liquid hydrocarbons, can be recovered and re-used in the method of the invention. The toluene or equivalent liquid aromatic hydrocarbons are advantageously used in pure form, for instance, as distilled from a mixture thereof with an alkyllithium such butyllithium.

The equipment for carrying out the method of our present invention, can, of course, take many different forms. For the production, for instance, of a 10 molar amount of lithium amide, it is convenient to use a 5-Liter glass flask with a 3-neck head through the openings in which a mechanical stirrer, a −50° to +200° C. thermometer and an ammonia dip tube extend into the flask for feeding liquid ammonia into the flask below the level of the liquid therein. A dry ice condenser connected to the flask is also provided as is, also, a tube for passing an inert gas, for instance, argon, into the flask to create an inert gas atmosphere in the flask in the space above the reactants level. The flask is disposed in a cooling bath, for instance, a dry ice-hexane cooling bath. Prior to use, all glassware and metalware are baked in an oven at 150° C. for 24 hours, then assembled hot and purged with argon or other inert gas until cool.

It will be seen, from the description of our invention, as generally set forth above, that the reactions which are involved in the practice of our invention, taking illustratively certain temperatures, the use specifically and particularly of active metallic cobalt as the catalyst, and the use of toluene as the liquid dispersing medium, are shown by the following two steps:

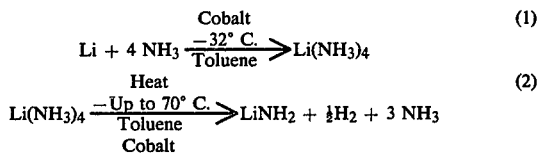

The following examples are illustrative of the practice of the method of our invention. Other examples will readily occur to those skilled in the art in light of the guiding principles and teachings disclosed herein. All temperatures recited are in degrees C.

EXAMPLE 1

(a) A dispersion of 7 g of lithium metal (10% of the total charge used in the preparation of the lithium amide), 1 g $CoCl_2.6H_2O$, and 100 ml of mineral oil (sold under the trade designation "MARKOL") are charged to a 500 ml stainless steel dispersion apparatus. By means of an electric heating mantle, the apparatus and its contents are heated to about 190°. This melts the lithium and reduces the cobalt compound to active metallic cobalt. The hot mixture is stirred at high speed for about 5 minutes and then cooled to about 90°. The mineral oil is removed by filtration in a 250 ml glass filter funnel and the dispersion is washed with dry toluene. At this time, the fine black particles of active metallic cobalt can be seen to be intermingled with the lithium dispersion, and then said dispersion is slurried with an additional amount of 100 ml of toluene and transferred to the main reaction flask.

(b) Into the 5-Liter 3-neck flask equipment described above, there is added the catalyst slurry prepared as described in part (a) of this Example, followed by the addition of 63 g of ½" diameter × 6" lithium metal rod previously precut into approximately ½" to 1" long pieces. The reaction vessel and contents are then cooled to about −40° by means of the dry ice-hexane cooling bath. Then 40 moles (680 g) of anhydrous liquid ammonia are added over a period of 30 minutes. This mixture is stirred at about −40° for about 2 hours or until all of the lithium dissolves to form a bronze solution. This solution is very pyrophoric and, if exposed to the atmosphere, burns with the characteristic red lithium flame. Therefore, care is taken to insure that this solution is well protected with an argon atmosphere at all times. Then 1700 ml of dry toluene are slowly added, with stirring, care being taken that the toluene not be added too fast, so that the temperature does not rise above the boiling point of ammonia (−33° C.) which would cause the ammonia to boil unduly vigorously, thus creating the danger of reactor boil-over. To avoid this possible situation, the toluene can be pre-cooled. A heterogeneous system is created upon addition of the toluene with the lithium-ammonia solution floating on the surface of the toluene.

(c) The flask and its contents are then heated, or the flask and its contents are allowed to heat up slowly, with stirring, preferably to about room temperature, which may take about 2 hours or so. During this time, the gaseous hydrogen, generated by the reaction, and the excess ammonia are liberated from the reaction mixture. As the solid lithium amide forms, it falls into the lower toluene layer. The stirring creates a slurry of solid lithium amide in the toluene layer. Again, care should be taken during this step to avoid reactor boil-over. In order to drive off all the excess ammonia and complete the conversion, the flask and contents are then slowly heated to about 45°. Gasing stops after about 1 hour of heating. A small amount of any non-converted lithium metal present floats on the surface of the toluene. About 80 to 90% of the lithium generally is converted at this time. The flask and contents may once again be cooled to about −40° and 170 g (10 moles) of anhydrous liquid ammonia added over a period of about 10 minutes. All of the non-converted lithium metal is dissolved in about 30 minutes, forming another but smaller bronze layer. The flask and contents are again heated, this time to about 70°. All of the lithium is converted into fine particles of light grey lithium amide.

(d) If desired, the lithium amide, in purified form, can be recovered, as such, by transferring the toluene slurry of lithium amide, produced in part (c) of this Example, by argon pressure to a 1-liter filter funnel with a medium porosity sintered glass plate. The filtration is rapid and is completed in about 5 minutes. The lithium amide is then washed in the filter funnel with 300 ml of dry hexane. Purging for about 3 hours with dry nitrogen removes the excess hexane. A total of 236 g (theory 232 g) of near white lithium amide is recovered which, on analysis, is found to be very finely divided lithium amide, 97.9% pure.

EXAMPLE 2

A series of additional experiments is run following the procedure described in Example 1. Where the lithium metal, an active surface metallic cobalt catalyst, toluene as the dispersing medium and liquid ammonia are used in single mole runs, the rate of ammonia take-up ranges from 15 to 60 minutes and the time period for the conversion of the $Li(NH_3)_4$ to lithium amide requires 2 to 3 hours where toluene is used in the reaction and a total of about 48 hours is required where n-hexane is used as the liquid hydrocarbon dispersing medium. Toluene, particularly, accelerates both steps of the reaction whereby to obtain complete conversion in the overall method to less than 8 hours.

EXAMPLE 3

This example is carried out in the same manner described in Example 1 with the following exceptions:

(i) Instead of the part (a) procedure of Example 1, 1 g of cobalt chloride hexahydrate is charged to the reactor and 2 ml of concentrated butyllithium (90%) are added. A vigorous reaction ensues whereby the cobalt chloride hexahydrate is reduced to finely divided cobalt metal.

(ii) In the part (b) procedure of Example 1, 70 g of the lithium metal rod are used instead of the 63 g called for in Example 1.

The following Table shows the results of various additional runs.

LITHIUM AMIDE VIA LITHIUM METAL AND ANHYDROUS LIQUID AMMONIA IN LIQUID AROMATIC HYDROCARBON

| Run No. | Lithium[1] (g/atoms) | Toluene (type) | (ml) | Catalyst (mg) | (Type) | Reaction Time (hrs) | Reaction[3] Temp. (max) (°C.) | LiNH$_2$ Theory (g) | LiNH$_2$ Recovered (g) | LiNH$_2$ Assay (%) | Remarks |
|---|---|---|---|---|---|---|---|---|---|---|---|
| 5 | 0.5 | 1 | 100 | 50 | Cobalt Chloride | 1.0 | 50 | 11.5 | 11.5 | 93.1 | Some conversion takes place overnight |
| 6 | 0.5 | 1 | 100 | 50 | Cobalt Chloride | 2.0 | 60 | 11.5 | 11.5 | 96.3 | Added anhydrous liquid NH$_3$, then converted |
| 7 | 0.5 | 1 | 100 | 50 | Cobalt Chloride | 3.0 | 60 | 11.5 | 12.5 | 93.9 | |
| 8 | 10.0 | 2 | 1100 | 1000 | Cobalt Chloride | 6.0 | 40 | 230.0 | 236.0 | 97.9 | Li dispersion (7g) & bulk Li (63g) employed |

[1]Lithium dispersion
[2]¼" metal rod cut into ⅛ to ¼" pieces.
[3]The reaction temperature is the maximum temperature reached during conversion and removal of excess ammonia.

What is claimed is:

1. In a method of preparing finely divided solid lithium amide, the steps which comprise providing a mixture containing lithium metal in bulk form or in the form of relatively large aggregates, a liquid aromatic hydrocarbon, anhydrous liquid ammonia, and a metal catalyst for enhancing the rate of formation of the lithium-ammonia compound in solution in said anhydrous liquid ammonia, maintaining said composition in an atmosphere free from moisture and at a low temperature and under conditions of agitation whereby to form a lithium-ammonia solution, a heterogeneous system resulting in which the lithium-ammonia solution in anhydrous liquid ammonia floats on the surface of the liquid aromatic hydrocarbon, and then raising the temperature whereby to liberate gaseous hydrogen and gaseous ammonia from said reaction mixture and to produce a solid lithium amide in finely divided form dispersed in the liquid aromatic hydrocarbon.

2. The method of claim 1, in which the catalyst is a finely divided active metallic cobalt added as such or formed in situ.

3. The method of claim 1, in which the liquid aromatic hydrocarbon is toluene.

4. The method of claim 1, in which the low temperature is in the range of from about 0° to −60° C. or lower.

5. The method of claim 1, in which the raising of the temperature is to a temperature in the range of from about room temperature to about 60° C.

6. In a method of preparing finely divided solid lithium amide, the steps which comprise providing a mixture containing (a) solid lithium metal in bulk form or in the form of relatively large aggregates, (b) at least one liquid aromatic hydrocarbon selected from the group consisting of toluene; mono- and di-ethyl and mono- and di-propyl and isopropyl benzenes and xylenes, (c) anhydrous liquid ammonia, and a finely divided active metallic cobalt as a catalyst, maintaining said composition in an inert atmosphere and free from moisture and a low temperature, and under conditions of agitation, whereby to form a lithium-ammonia solution, adding an additional amount of said liquid aromatic hydrocarbon, a heterogeneous system resulting in which the lithium-ammonia solution in anhydrous liquid ammonia floats on the surface of the liquid aromatic hydrocarbon, and then raising the temperature whereby to liberate gaseous hydrogen and gaseous ammonia from said reaction mixture and to produce solid lithium amide in finely divided form dispersed in the liquid aromatic hydrocarbon.

7. In a method of preparing finely divided solid lithium amide, the steps which comprise:
(a) incorporating into a reaction vessel lithium metal in bulk or relatively large aggregate form, toluene, and finely divided active metallic cobalt as a catalyst,
(b) admixing therewith anhydrous liquid ammonia under conditions of agitation and maintaining said mixture within a low temperature range under agitation conditions until at least most of the lithium metal dissolves to form a bronze lithium-ammonia solution,
(c) gradually adding a substantial additional amount of toluene to said solution under conditions of agitation whereby a heterogeneous system is created in which a lithium-ammonia solution in liquid ammonia floats on the surface of the toluene,
(d) and effecting formation of solid lithium amide by gradually raising the temperature of the contents of the reaction flask, under conditions of agitation, while liberating hydrogen and excess ammonia, the solid lithium amide, as it forms, falling into the lower toluene layer to produce a slurry of said solid lithium amide in said toluene.

8. In a method of preparing finely divided solid lithium amide, the steps which comprise:
(a) admixing pulverulent metallic cobalt in a dispersion in toluene prepared by heating a mineral oil dispersion of lithium metal and cobalt chloride hexahydrate to melt said lithium metal and to effect reduction of said cobalt chloride to a finely divided active metallic cobalt, removing said mineral oil and washing said remaining dispersion with toluene and slurrying said dispersion with toluene, (b) adding said dispersion formed in step (a) and lithium metal in bulk form or in the form of relatively large aggregates, (c) cooling to a temperature in the range of about 0° to about −60° C. or lower, (d) gradually adding anhydrous liquid ammonia under conditions of agitation and while maintaining said mixture within said temperature range under agitation conditions until at least most of the lithium metal dissolves to form a bronze solution;

(e) gradually adding a substantial additional amount of toluene under conditions of agitation whereby a heterogeneous system is created in which the lithium-ammonia solution in liquid ammonia floats on the surface of the toluene, (f) effecting formation of solid lithium amide by gradually raising the temperature of the mixture, under conditions of agitation, while liberating hydrogen and excess ammonia, the solid lithium amide, as it forms, falling into the lower toluene layer to form a slurry of said solid lithium amide in said toluene, (g) removing ammonia, and (h) recovering the solid lithium amide in finely divided form from the toluene.

9. The method of claim 8, in which the raising of the temperature in step (f) is to a temperature in the range of from about room temperature to about 60° C.

* * * * *